US007392305B2

(12) United States Patent
Mudigonda et al.

(10) Patent No.: US 7,392,305 B2
(45) Date of Patent: *Jun. 24, 2008

(54) DYNAMIC CONNECTION SERVICE CATEGORY CHANGES

(75) Inventors: Uma Mahesh Mudigonda, Bangalore (IN); Somashekar Srinivasajah Venkatesh Murthy, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 11/518,477

(22) Filed: Sep. 7, 2006

(65) Prior Publication Data

US 2007/0005772 A1 Jan. 4, 2007

Related U.S. Application Data (63) Continuation of application No. 10/461,691, filed on Jun. 13, 2003, now Pat. No. 7,162,520.

(51) Int. Cl.
*G06F 15/16* (2006.01)

(52) U.S. Cl. .................. 709/223; 709/224; 370/352

(58) Field of Classification Search ......... 709/200–201, 709/223–229; 370/250, 254, 351–352
See application file for complete search history.

(56) References Cited

U.S. PATENT DOCUMENTS

| 5,519,836 | A | 5/1996 | Gawlick et al. |
| 5,754,532 | A | 5/1998 | Dev et al. |
| 5,894,471 | A | 4/1999 | Miyagi et al. |
| 6,115,372 | A | 9/2000 | Dinha |
| 6,125,119 | A | 9/2000 | Cherukuri et al. |
| 6,128,305 | A | * 10/2000 | Hjalmtysson et al. ....... 370/410 |
| 6,195,714 | B1 | 2/2001 | Li et al. |
| 6,243,387 | B1 * | 6/2001 | Hjalmtysson et al. ....... 370/410 |
| 6,556,577 | B2 * | 4/2003 | Hjalmtysson et al. ....... 370/410 |
| 6,643,265 | B1 * | 11/2003 | Schzukin ................... 370/242 |
| 6,744,733 | B2 | 6/2004 | Kamo |
| 6,822,962 | B1 | 11/2004 | Noake et al. |
| 7,016,375 | B1 * | 3/2006 | Rosenberg et al. .......... 370/468 |
| 7,162,520 | B1 * | 1/2007 | Mudigonda et al. ......... 709/223 |
| 2002/0054576 | A1 | 5/2002 | Gobbi |
| 2003/0099192 | A1 | 5/2003 | Scott et al. |
| 2004/0022247 | A1 | 2/2004 | Chen et al. |

* cited by examiner

*Primary Examiner*—Moustafa Meky
(74) *Attorney, Agent, or Firm*—Thelen Reid Brown Raysman & Steiner LLP (57) ABSTRACT

An apparatus dynamically changes a connection service category for a soft permanent virtual circuit (SPVC). The apparatus includes a first interface, a second interface, a control interface receiving a command including a new connection service category for an exiting SPVC, and a module responsive to the command. The SPVC includes a permanent virtual circuit (PVC) connection leg set up from a source end to the first interface, and a switched virtual circuit (SVC) connection leg set up from the second interface to a destination-end via a communications network. The module releases the SVC connection leg while maintaining the PVC connection leg, de-allocates resources from the PVC connection leg, allocates new resources corresponding to the new connection service category and traffic parameters on the PVC connection leg, and creates a new SVC connection leg in accordance with the new connection service category and the traffic parameters.

19 Claims, 6 Drawing Sheets

| CTT Row Index | Service Category | PCR (CLP0+1) | SCR (CLP0+1) | CDVT | Use |
|---|---|---|---|---|---|
| 1 | UBR | 7113539 | — | None | Default PVP/PVC row index |
| 2 | CBR | 424 kbps | — | None | CBR tunnel well-known virtual connections |
| 3 | VBR-RT | 424 kbps | 424 kbps | 50 | Physical interface and VBR-RT tunnel well-known virtual connections |
| 4 | VBR-NRT | 424 kbps | 424 kbps | 50 | VBR-NRT tunnel well-known virtual connections |
| 5 | ABR | 424 kbps | — | None | — |
| 6 | UBR | 424 kbps | — | None | UBR tunnel well-known virtual connections |

DYNAMIC CONNECTION SERVICE CATEGORY CHANGES

CROSS REFERENCE TO RELATED APPLICATION AND PRIORITY CLAIM

This application is a continuation of U.S. patent application Ser. No. 10/461,691, entitled "Method and Apparatus for Dynamic Connection Service Category Changes", filed on Jun. 13, 2003 now U.S. Pat. No. 7,162,520 in the names of the same inventors.

FIELD OF THE INVENTION

The present invention relates to computer internetworking and telecommunications. More particularly, the present invention relates to a method and apparatus for dynamically changing a connection service category of existing virtual circuits.

BACKGROUND OF THE INVENTION

Figure 1:
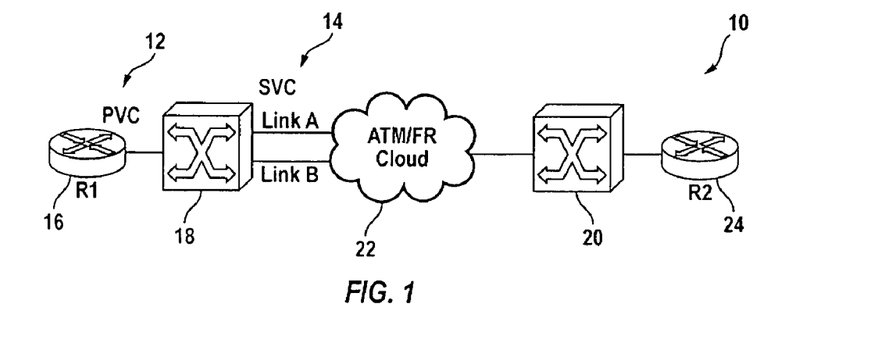
FIG. 1 is a diagram schematically illustrating a typical Soft Permanent Virtual Circuit which includes a Permanent Virtual Circuit (PVC) connection leg and a Switched Virtual Circuit (SVC) connection leg.

FIG. 1 schematically illustrates a typical Soft Permanent Virtual Circuit (SPVC) 10 which includes a Permanent Virtual Circuit (PVC) connection leg 12 and a Switched Virtual Circuit (SVC) connection leg 14. For example, as shown in FIG. 1, the PVC connection leg 12 is set up from an edge router 16 to a network switch 18, and the SVC connection leg 14 is set up from the network switch 18 to another network switch 20 via a communications network 22. The SVC connection leg 14 may be set up inside a Service Provider network. As shown in FIG. 1, the network switch 20 may be an destination end device, or may be coupled to a destination device (router) 24.

An SVC is dynamically established on demand and is torn down when transmission is complete. SVCs are also referred to as Switched Virtual Connections in Asynchronous Transfer Mode (ATM) terminology. An SPVC allows devices (for example, the routers 16 and 24 in FIG. 1) attached to the network switches to be interconnected via virtual circuits which will be automatically rerouted around failures in the communications network. For example, as shown in FIG. 1, an SVC is dynamically created, using link A or link B. If either link fails, the SVC is automatically reestablished using the other link.

On the other hand, a PVC must be explicitly configured using a specific link, for example, either link A or link B in FIG. 1, and all network devices (switches and/or routers) along the virtual circuit (or path) must be explicitly configured. Each link between the network devices is also individually identified using a connection identifier, for example, virtual channel identifier (VCI) and virtual path identifier (VPI) defined at the interfaces of the network devices. In an ATM cell header, the VCI and VPI are a 16-bit field and a 8-bit field, respectively. In PVCs, the VCI and the VPI are used to identify the next destination of a cell as it passes through a series of ATM switches on its way to its destination. ATM switches use the VPI/VCI fields to identify the next network virtual channel link (VCL) that a cell needs to transit on its way to its final destination.

In a Frame Relay (FR) network, a data-link connection identifier (DLCI) is used. A value of the DLCI specifies a PVC or an SVC in a similar manner as the VPI and VCI. In the basic FR specification, DLCIs are locally significant (connected devices might use different values to specify the same connection). However, in the Local Management Interface (LMI) extended specification, DLCIs are globally significant and DLCIs specify individual end devices.

A connection service category is associated with each SPVC connection, which is typically defined by traffic parameters and parameter values per interface. The association between an SPVC connection and its service category is set up at the time of the creation of the connection. If the service category of an existing SPVC connection needs to be changed, a user or system administrator must delete the entire SPVC connection, and then create a new connection for the new service category with the modified/new traffic parameters. That is, both of the PVC and SVC legs must be removed and recreated with new commands using (hopefully) the same VPI/VCI values. However, since there is always a finite delay (SPVC downtime) between an explicit deletion of the existing connection and reconfiguration of a new connection, the VPI/VCI values in the original connection might be used by other circuits during the downtime, and thus the original VPI/VCI values cannot be guaranteed in the new connection. This means that the new connection would lose its identity with the original connection, and would be considered as a completely different connection.

This may pose a problem especially at the edge where the Service Provider may require the Enterprise or connecting router at the edge to change the parameters. The problem becomes complicated, if the connecting router/switch is in a restricted domain such as a Central Office since some legal paperwork may have to be executed for a new connection identified by new VPI/VCI values different form the original values.

BRIEF DESCRIPTION OF THE INVENTION

An apparatus dynamically changes a connection service category for a soft permanent virtual circuit (SPVC). The apparatus includes a first interface, a second interface, a control interface receiving a command including a new connection service category for an exiting SPVC, and a module responsive to the command. The SPVC includes a permanent virtual circuit (PVC) connection leg set up from a source end to the first interface, and a switched virtual circuit (SVC) connection leg set up from the second interface to a destination end via a communications network. The module releases the SVC connection leg while maintaining the PVC connection leg, de-allocates resources from the PVC connection leg, allocates new resources corresponding to the new connection service category and traffic parameters on the PVC connection leg, and creates a new SVC connection leg in accordance with the new connection service category and the traffic parameters.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a method and apparatus for dynamic connection service category changes. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer, or high performance server running an OS such as Solaris® available from Sun Microsystems, Inc. of Palo Alto, Calif., Microsoft® Windows® XP and Windows® 2000, available form Microsoft Corporation of Redmond, Wash., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet.

In the context of the present invention, the term "network" includes local area networks (LANs), wide area networks (WANs), the Internet, cable television systems, telephone systems, wireless telecommunications systems, fiber optic networks, asynchronous transfer mode (ATM) networks, frame relay networks, satellite communications systems, and the like. Such networks are well known in the art and consequently are not further described here.

Figure 2:
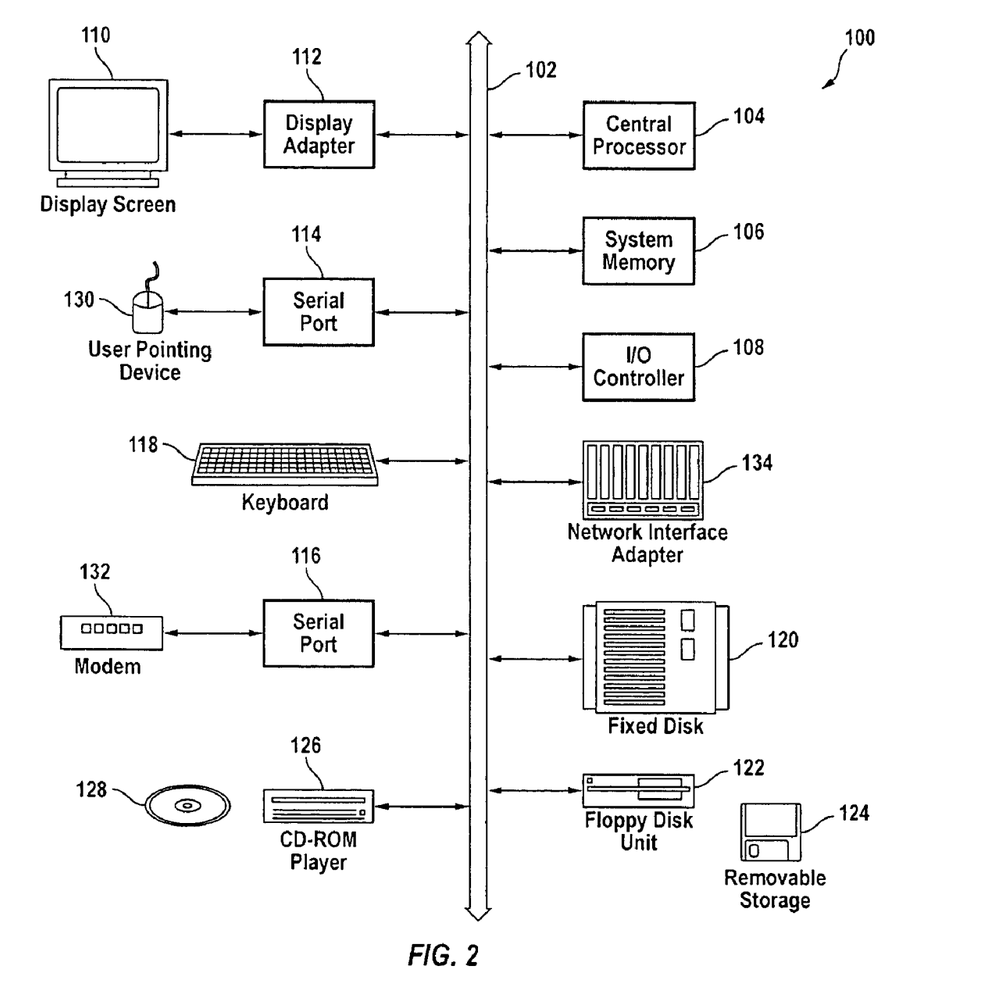
FIG. 2 is a diagram schematically illustrating a block diagram of a computer system suitable for implementing aspects of the present invention.

FIG. 2 depicts a block diagram of a computer system 100 suitable for implementing aspects of the present invention. As shown in FIG. 2, computer system 100 includes a bus 102 which interconnects major subsystems such as a central processor 104, a system memory 106 (typically RAM), an input/output (I/O) controller 108, an external device such as a display screen 110 via display adapter 112, serial ports 114 and 116, a keyboard 118, a fixed disk drive 120, a floppy disk drive 122 operative to receive a floppy disk 124, and a CD-ROM player 126 operative to receive a CD-ROM 128. Many other devices can be connected, such as a pointing device 130 (e.g., a mouse) connected via serial port 114 and a modem 132 connected via serial port 116. Modem 132 may provide a direct connection to a remote server via a telephone link or to the Internet via a POP (point of presence). Alternatively, a network interface adapter 134 may be used to interface to a local or wide area network using any network interface system known to those skilled in the art (e.g., Ethernet, xDSL, AppleTalk™).

Many other devices or subsystems (not shown) may be connected in a similar manner. Also, it is not necessary for all of the devices shown in FIG. 2 to be present to practice the present invention, as discussed below. Furthermore, the devices and subsystems may be interconnected in different ways from that shown in FIG. 2. The operation of a computer system such as that shown in FIG. 2 is readily known in the art and is not discussed in detail in this application, so as not to overcomplicate the present discussion. Code to implement the present invention may be operably disposed in system memory 106 or stored on storage media such as fixed disk 120, floppy disk 124 or CD-ROM 128.

As discussed above, the conventional SPVC, or Soft-Virtual Circuit (VC)/Virtual Path (VP) implementation does not allow modification of connection service category for an established Soft-VC/VP connection without explicitly being removed from configuration and then re-configured with the new connection service category and new connection parameters. The present invention, which is disclosed in detail bellow, allows the modification of a service category for an established SPVC, and provides a novel method and apparatus for changing a connection service category and modifying the connection (traffic) parameters for SPVC without explicit deletion and recreation of the SPVC. The present invention is applicable to both frame relay (FR) SPVCs and ATM SPVCs.

Figure 3A:
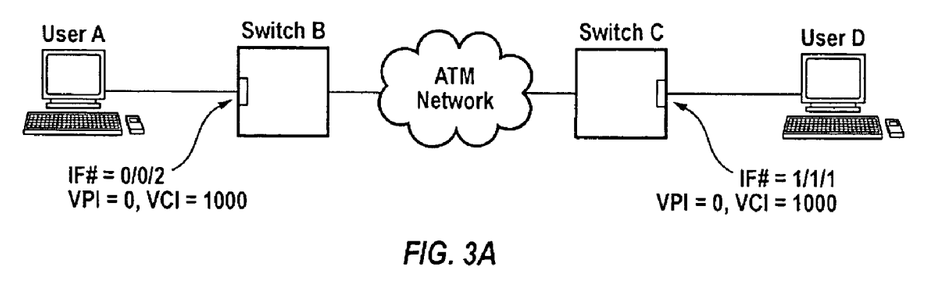
FIG. 3A is a diagram schematically illustrating an example of a Soft-VC in accordance with one embodiment of the present invention.
Figure 3B:
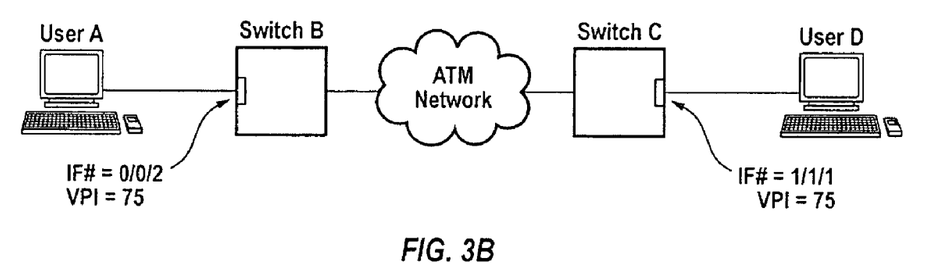
FIG. 3B is a diagram schematically illustrating an example of a Soft-VP in accordance with one embodiment of the present invention.

FIGS. 3A and 3B schematically illustrate examples of a Soft-VC and a Soft-VP, respectively, in accordance with one embodiment of present invention. As shown in FIG. 3A, a Soft-VC is identified by a connection identifier (VPI, VCI=0, 1000) defined at an interface (IF#=0/0/2) of Switch B for a source end (User A) and at an interface (IF#=1/1/1) of Switch C for a destination end (User D). Similarly, as shown in FIG. 3B, a Soft-VP is identified by a connection identifier (VPI=75) defined at the interface (IF#=0/0/2) of Switch B for the source end (User A) and at the interface (IF#=1/1/1) of Switch C for a destination end (User D). These values of the connection identifier are by way of example and is not intended to be exhaustive or limiting in any way. A virtual path (VP) is a logical group of virtual circuits, and unless specified otherwise everything that is applicable for a Soft-VC is also applicable for Soft-VP and vice-versa. In the following description, "Soft Permanent Virtual Circuits (SPVCs)" include both Soft-VCs and Soft-VPs.

Figure 4:
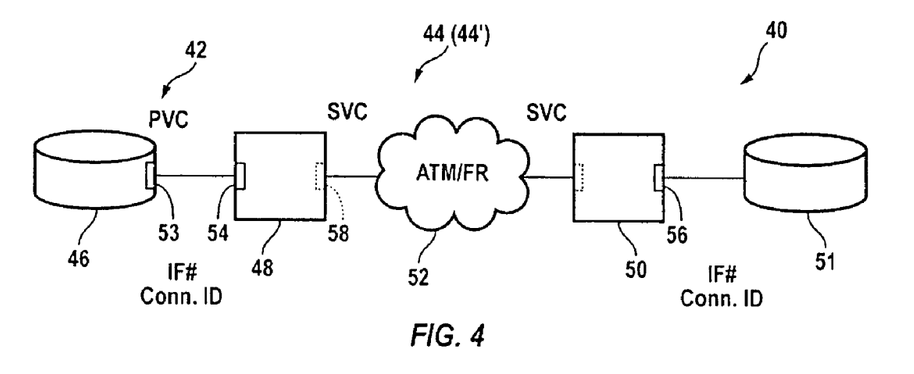
FIG. 4 is a diagram schematically illustrating a Soft Permanent Virtual Circuit (SPVC) in accordance with one embodiment of present invention.

FIG. 4 schematically illustrates an SPVC 40 in accordance with one embodiment of present invention. As shown in FIG. 4, the SPVC 40 includes a Permanent Virtual Circuit (PVC) connection leg 42 and a Switched Virtual Circuit (SVC) connection leg 44. The PVC connection leg 42 may be set up from a source end 46, for example, an edge router, to a network device 48, for example, a network switch. The SVC connection leg 44 may be set up from the network device 48 to a destination end 50 via a communications network 52. The destination end 50 may be a destination network switch as shown in FIG. 4, or may be a destination edge router (as denoted by reference numeral 51 in FIG. 4). The communications network 52 may be an ATM network or a FR network.

Figure 5:
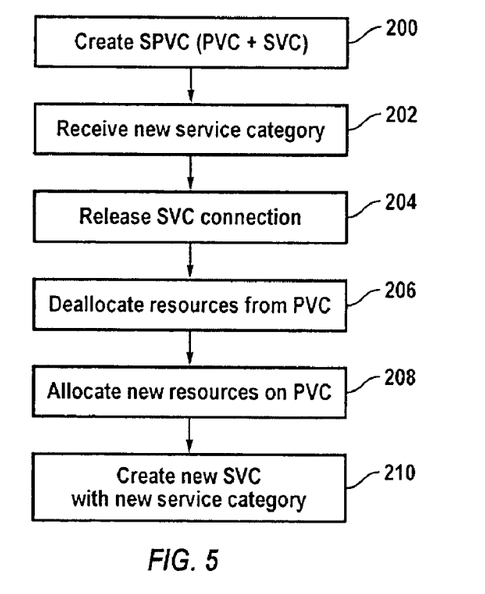
FIG. 5 is a process flow diagram schematically illustrating a method for dynamically changing a connection service category for an SPVC in accordance with one embodiment of present invention.
Figure 6:
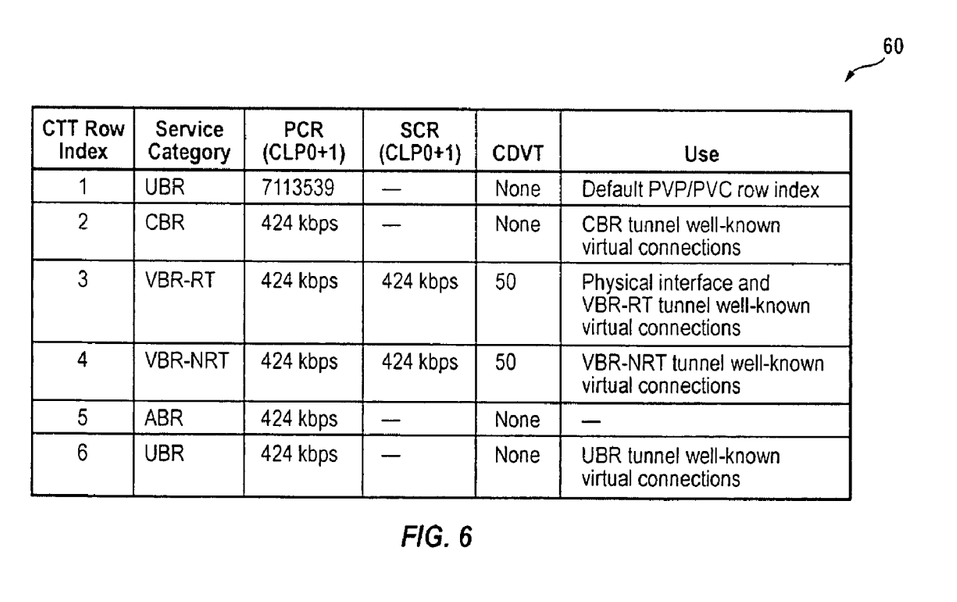
FIG. 6 is a diagram schematically illustrating an example of a connection traffic table (CTT).

FIG. 5 schematically illustrates a method for dynamically changing a connection service category for an SPVC, such as the SPVC 40 shown in FIG. 4, in accordance with one embodiment of present invention. When an SPVC connection is initially created (200), a connection service category is associated to the connection. A connection category is typically specified by a corresponding set of connection parameters, such as traffic parameters. For example, the connection parameters may include a minimum cell rate (MCR), a peak cell rate (PCR), a cell delay variation tolerance (CDVT), a maximum burst size (MBS), a sustained cell rate (SCR), a packet discard (PD), and the like. One or more of the traffic parameters with their specific values may be associated to a specific connection service category. The association between each connection service category and values of the corresponding connection parameters may be maintained in a form of connection traffic table (CTT). FIG. 6 schematically illustrates an example of a CTT 60.

Referring to FIGS. 4 and 5, when initially creating the SPVC (200), an ATM address of the destination end 50 is determined, and a source end interface 54 and a destination end interface 56 are selected. These interfaces are typically identified using the interface identifier (IF#). As shown in FIG. 4, the source end interface 54 for the PVC connection leg 42 is defined for the network device 48. The connection between the interfaces 54 and 56 are configured in accordance with the service category and the corresponding connection parameters. In the initial configuration, at least one value for a connection identifier for the interface 54 is selected from among unused values and administratively assigned to the interface 54. For example, values for the connection identifier VPI/VCI (using two values) are selected for a Soft Permanent VC (as shown in FIG. 3A), and a value for the connection identifier VPI is selected for a Soft-Permanent VP (as shown in FIG. 3B). Similarly, for a frame relay (FR) network, a value for the connection identifier DLCI is selected and assigned. As shown in FIG. 4, the network device 48 also has an interface 58 for the SVC connection leg 44. The SVC connection leg 44 has its own connection identifier defined at the SVC interface 58, which is dynamically allocated, as described above, and may be the same or different from the connection identifier of the PVC connection leg 42. These connection identifiers (IDs) are assigned at the time of creation of the SPVC 40.

When the service category of the existing SPVC 40 is to be changed, a new connection service category for the existing SPVC 40 is received (202). For example, the new connection service category may be specified by a connection traffic table row (CTTR) index per data flow (i.e., for transmitting signal Tx and receiving signal Rx). Such a new connection category may be received with a command to modify the connection service category for the existing SPVC connection. For example, a user or system administrator issues such a command via a command line interface (CLI), or using a simple network management protocol (SNMP). In the latter case, the system also maintains a management information base (MIB) for the connection service categories, as is well understood by one of the ordinary skill in the art.

In response to such a command, the SVC connection leg 44 is released (204), while the PVC connection leg 42 is maintained. Thus, if the service category is changed for this existing SPVC 40, the SVC connection ID at the SVC interface 58 may or may not change (since it's dynamically allocated), but the PVC connection ID at the PVC interface 54 remains unchanged. That is, although the identity of the SVC connection leg 44 might be lost, that of the PVC connection leg 42 is maintained, preserving the identity of the SPVC 40.

Then, resources for the SPVC connection are de-allocated from the PVC connection leg 42 (206). For example, the resources include interface resources, switch fabric resources, and firmware resources. Then, new resources corresponding to the new connection service category (and a corresponding set of connection parameters) are allocated on the PVC connection leg 42 (208), and a new SVC connection leg 44' is created in accordance with the new connection service category so as to form a new SPVC from the source end to the destination end (210).

Figure 7:
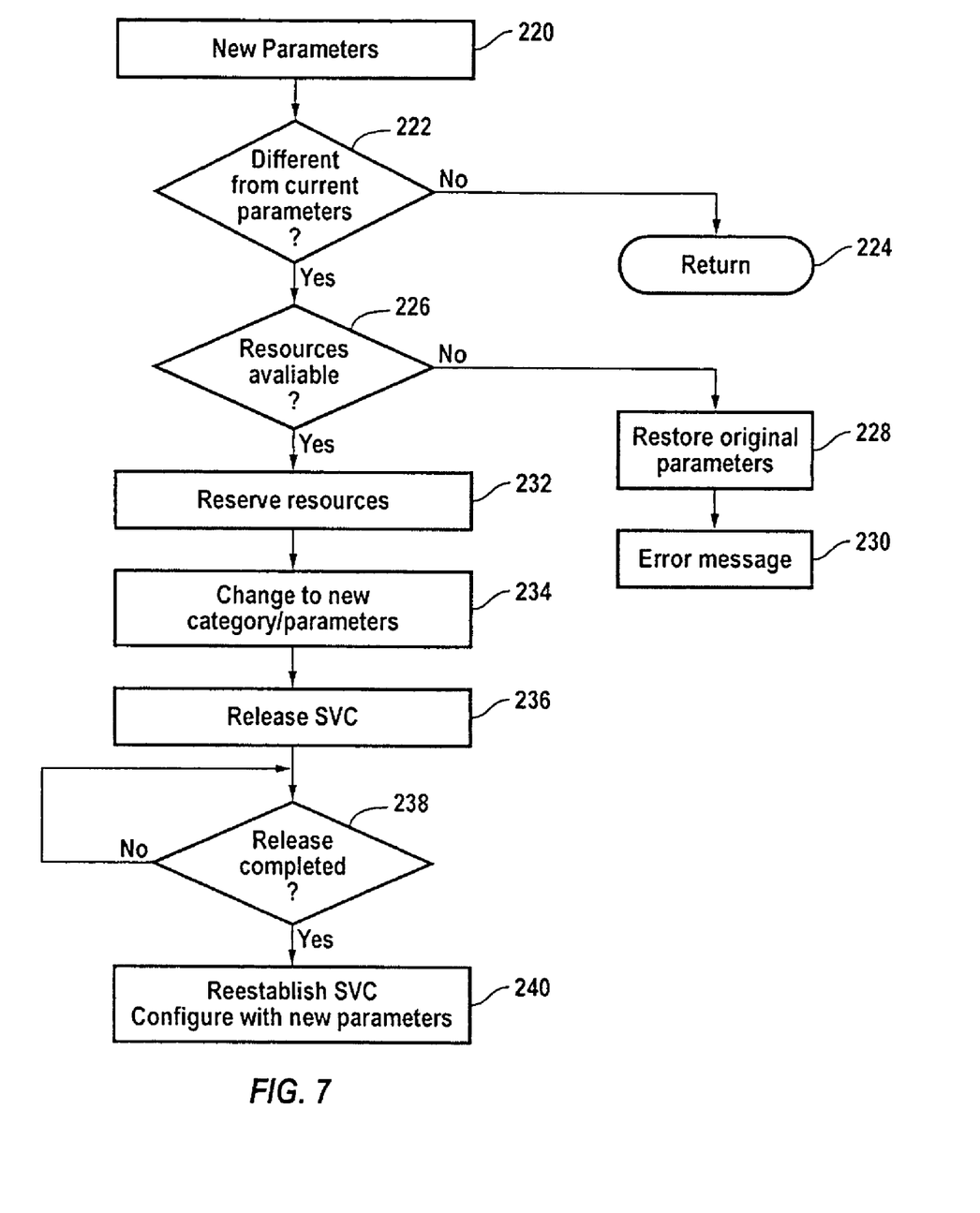
FIG. 7 is a process flow diagram schematically illustrating a method for dynamically changing a connection service category for an existing SPVC in accordance with one embodiment of present invention.

FIG. 7 schematically illustrates a method for dynamically changing a connection service category for an existing SPVC in accordance with one embodiment of present invention. In this embodiment, when a new connection category (with a corresponding set of new parameter values) is received (220), whether the new connection service category is different from a current connection service category is determined (222). If the new service category is not different from the current one, the process returns (224).

If the new service category is different from the current one, the resource availability is checked (226) before closing the SVC connection leg. If the currently available resources are not sufficient for the new connection service category (and new connection parameters), the original connection service category (and the corresponding connection parameters) is restored (228), and an error message may be issued (230). This checking process avoids such a situation where the SVC connection leg is closed first and then the available resources are found to be insufficient for the new connection service category. In such a case, the resources previously allocated need to be restored, or the connection may have to be permanently removed if the PVC connection leg does not have any resources at the time of restoration. The checking process 226 also reduces the downtime of the SPVC.

If sufficient resources are available for the new connection service category, the necessary resources are reserved for the new connection service category (232), and the connection service category and the corresponding connection parameters are changed to that for the new connection service category (234). The SVC connection leg is then released (236). This release of the SVC connection leg may be performed by sending a RELEASE message from the source end to the destination end. After confirming completion of the release (238), a new SVC is reestablished in accordance with the new connection service category, configuring the SVC connection according to the new connection parameters (240). In step 238, the release of the SVC connection may be confirmed by receiving a RELEASE COMPLETE message from the destination end. It should be noted that the PVC connection leg is not released and thus the connection identifier values are preserved during the service category change process.

In accordance with one embodiment of the present invention, the entire resources for the old connection service category are released, and then new resources for the new connection service category are allocated to the new connection. Alternatively, "delta" resources corresponding to the difference between the old connection parameters and the new connection parameters may be reduced (released) or added (allocated) to the existing resources. However, this approach may increase complexity of calculating the difference between equivalent bandwidth for different service categories, and then increasing or reducing the bandwidth accordingly.

The present invention applies to both single-ended and double-ended SPVC provisioning (i.e., modification of parameters for an existing subscriber account). The dynamic connection service category change in accordance with the present invention can also be extended to support double-ended SPVC provisioning by signaling the modified connection parameters including service category change information from the source end to the destination end through use of Generic Application Transport (GAT) information element (IE).

When a RELEASE message is sent from the source switch tearing down a double-ended SPVC connection, it will carry a GAT IE indicator that will specify that the connection is being torn down because of dynamic changes to the service category and that the VPI/VCI or DLCI values must be preserved across connection modifications. Slave end-point connection (i.e., destination leg) would be modified to have the new service class and traffic parameters if the connection is honored at the destination end. If connection is rejected at the destination end, the end-point still hangs on to the old service class and connection parameters.

When a SETUP message is sent from the same source end asking for the new service category, and if the connection is accepted by the destination end, the new connection will be honored at the destination end with the same connection identifier VPI/VCI and DLCI values. In case which the connection is rejected by the destination end, the source end may need to restore the old service class and connection parameters manually to setup the connection.

Figure 8:
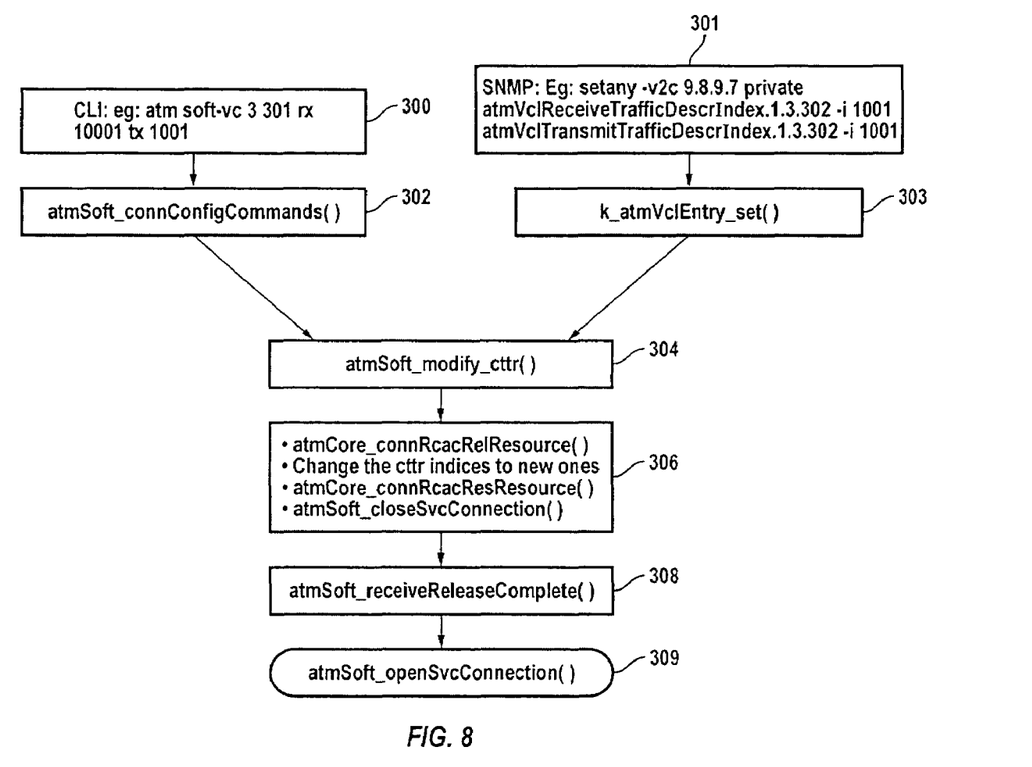
FIG. 8 is a diagram schematically illustrating an example of implementing the method for dynamically changing a connection service category for an existing ATM-SPVC in accordance with one embodiment of the present invention.

FIG. 8 schematically illustrates an example of implementing the method for dynamically changing a connection service category for an existing ATM-SPVC in accordance with one embodiment of the present invention. The connection service category of an exiting SPVC can be changed via CLI (300) or using SNMP (301).

Conventional commands via CLI for ATM-SPVC allow only "enable," "disable," and "redo-explicit" options for an existing SPVC connection. However, in accordance with the present invention, a user or system administrator is allowed to specify Rx-CTTR and Tx-CTTR values for modification of traffic parameters. The following is an example of the syntax for a conventional ATM SPVC (Soft-VCNVP):

Atm {soft-vp/soft-vc} vpi [vci] [enable/disable] [redo-explicit [explicit-path precedence {name path-name/identifier path-id} [upto partial-entry index]] [only-explicit]]

In order to facilitate modification of CTTR index for an existing/configured Soft VP/VC, the following key-words rx-cttr and tx-cttr are added (new syntax):

Atm {soft-vp/soft-pvc} vpi [vci] [enable/disable] [redo-explicit [explicit-path precedence {name path-name/identifier path-id} [up to partial-entry index]] [only-explicit]] [rx-cttr index] [tx-cttr index]

The above option is only applicable to an existing (i.e., already configured) Soft-VC/VP connection. If the user enters only either one of the rx-cttr index or the tx-cttr index, the existing value is taken for the unspecified index when recreating the Soft-VC/VP connection.

Similarly, the CLI for FR Soft-VC connections is also changed. The existing syntax is as follows:

Frame-relay soft-vc dlci [enable/disable] [redo-explicit [explicit-path precedence {name path-name/identifier path-id} [uptopartial-entry-index]] [only-explicit]]

In order to facilitate the modification of CTTR index for an existing FR Soft-VC connection, the key-word "rx-cttr" and "tx-cttr" are added: p1 frame-relay soft-vc dlci [enable/disable] [redo-explicit [explicit-path precedence {name path-name/identifier path-id} [uptopartial-entry-index]] [only-explicit]] [rx-cttr index] [tx-cttr index]

With this modification, as shown in FIG. 8, the user can specify the Tx CTTR index and the Rx CTTR index via CLI (300).

Similarly, the SNMP interface is also changed. For example, the SNMP code is changed to allow modification of atm VclReceiveTrafficDescrIndex and Atm VclTransmitTrafficDescrIndex values for an existing Soft-VC connection of the ATM-MIB. Similarly, casfVcEndptRxTraafficDescrRow and casfYcEndpTxTrafficDescrRow values for existing Soft-VC connection for ATM-SWITCH-FR-IWF MIB will be made modifiable. With this modification, as shown in FIG. 8, the user can specify the Tx CTTR index and the Rx CTTR index using SNMP (301).

When the user modifies the traffic parameters of an existing SPVC connection through CLI (300) with a corresponding command (302), or using SNMP (301) with a corresponding command (303), a module for modifying the traffic parameters, atmSoft_modify_cttr( ), is called (304). In the modify function, it is determined if the new CTTR indices are different from the old ones. If they are not different, the process returns. If the new CTTR indices are different from the old ones, the process continues and performs the following functions (306): releasing existing resources; atmCore_connRcacRelResource( ); changing the CTTR indices in the Configinfo to reflect the new ones; reserving the resources with resect to the new CTTR indices: atmCore_connRcacResResiurce( ). If the required resources are not available, the previous CTTR indices are restored and the process returns with an error message. If resources are available, the current FSM state is checked, and the FSM state is checked to ATM_SOFT_FSM_MODIFYING and a module for closing SVC connection, atmSoft_closeSvcConnection( ), is called depending on the current state.

When "Release Complete" is received from the destination end (308), the FSM state is checked and a module for creating the new SVC, atmSoftReestablish_new_cttr( ), is called, which recreates the SVC with the new parameters (309) if the FSM sate is ATM_SOFT_FSM_MODIFYING.

Figure 9:
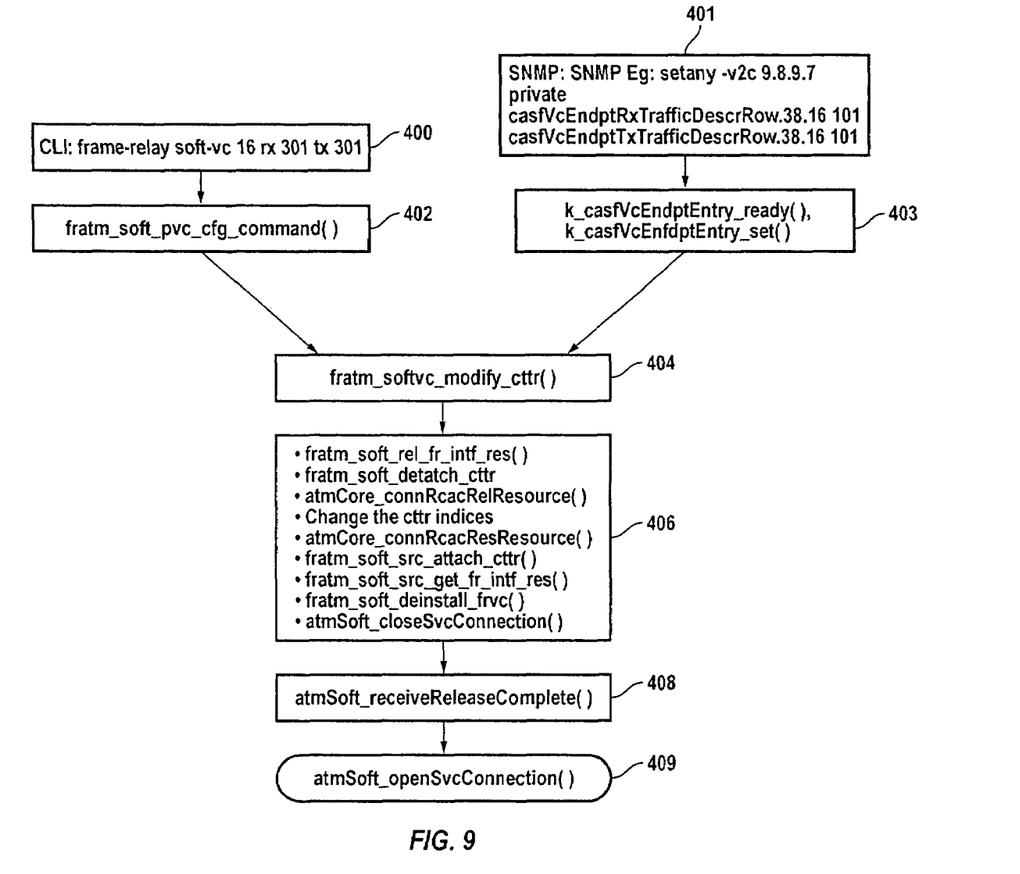
FIG. 9 is a diagram schematically illustrating an example of implementing the method for dynamically changing a connection service category for an existing FR-SPVC in accordance with one embodiment of the present invention.

FIG. 9 schematically illustrates an example of implementing the method for dynamically changing a connection service category for an existing FR-SPVC in accordance with one embodiment of the present invention. Similarly to the previous embodiment, the connection service category of an exiting FR-SPVC can be changed via CLI (400) or using SNMP (401). In the similar manner as the ATM-SPVC, new CTTR indices are input with a respective command (402, 403), and a module for modifying the CTTR indices is called (404), and through various functions as described above, the SVC connection leg of the FR-SPVC is closed (406). After receiving "Release Complete" message (408), the new FR-SPVC is established (409).

As described above, in the conventional system, the user needs to remove an existing SPVC and then set up a new SPVC for the service category change of an existing SPVC with modified traffic parameters. That is, both the PVC and SVC connection legs would be removed and recreated. The conventional system has disadvantages that that the PVC connection ID can be allocated by some other circuits in interim of the deletion and the recreation of SPVC connections. However, in accordance with embodiments of the present invention, the user need not delete the PVC connection of the SPVC while modifying the service category and traffic parameters. Instead, the resources allocated for the PVC connection at the source end will be modified without changing its connection ID. Although the connection ID of the SVC connection may remain unchanged or be changed to a new one if the old ID has been used by other circuits during the time between the deletion and recreation, since the PVC connection ID will not change, the identity of the original SPVC connection is preserved.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. An apparatus for dynamically changing a connection service category for a soft permanent virtual circuit, the apparatus comprising:
    a first interface for a permanent virtual circuit (PVC) connection leg;
    a second interface for a switched virtual circuit (SVC) connection leg;
    a control interface adapted to receive a command including a new connection service category for an existing soft permanent virtual circuit (SPVC), the SPVC including a PVC connection leg set up from a source end to the first interface and a SVC connection leg set up from the second interface to a destination end via a communications network; and
    a module responsive to the command, the module including:
        a releaser adapted to release the SVC connection leg, while maintaining the PVC connection leg;
        a resource allocator adapted to de-allocate resources from the PVC connection leg and to allocate new resources on the PVC connection leg, the new resources corresponding to the new connection service category and traffic parameters; and
        a connection creator adapted to create a new SVC connection leg in accordance with the new connection service category and the traffic parameters.

2. The apparatus in accordance with claim 1, wherein the module further comprises:
    an identification preserver adapted to maintain a connection identifier for the SPVC while the SVC connection leg is released, the connection identifier being assigned when the SPVC is created.

3. The apparatus in accordance with claim 2, wherein the communications network includes an Asynchronous Transfer Mode (ATM) network, the connection identifier comprising:
    a virtual path identifier (VPI); and
    a virtual channel identifier (VCI).

4. The apparatus in accordance with claim 2, wherein the communications network includes a Frame Relay (FR) network, the connection identifier comprising:
    a data-link connection identifier (DLCI).

5. The apparatus in accordance with claim 1, wherein the module further comprises:
    a signaler adapted to signal the new traffic parameters and indicate a change in the connection service category to the destination end.

6. The apparatus in accordance with claim 5, wherein the signaler uses a Generic Application Transport (GAT) information element.

7. The apparatus in accordance with claim 1, wherein the releaser is adapted to send a RELEASE message to the destination end, and to receive a RELEASE COMPLETE message from the destination end.

8. The apparatus in accordance with claim 1, wherein the module further comprises:
    a parameter checker adapted to determine if the new connection service category received is different from a current connection service category of the existing SPVC.

9. The apparatus in accordance with claim 1, wherein the module further comprises:
    a resource checker adapted to determine if resources are available for the new connection service category received; and
    a resource reserver adapted to reserve resources for the new connection service category before the releaser releases the SVC connection leg.

10. The apparatus in accordance with claim 9, wherein the resource checker issues an error message if resources are not available for the new connection service category.

11. The apparatus in accordance with claim 1, further comprising:
    a database adapted to maintain an association between each connection service category and values of the corresponding connection parameters.

12. The apparatus in accordance with claim 11, wherein the association is in a form of connection traffic table (CTT).

13. The apparatus in accordance with claim 12, wherein the new connection service category is specified by a connection traffic table row (CTTR) index per data flow.

14. The apparatus in accordance with claim 11, wherein the connection parameters include:

traffic parameters.

15. The apparatus in accordance with claim 1, wherein the traffic parameters include at least one of:

a minimum cell rate (MCR);
   a peak cell rate (PCR);
   a cell delay variation tolerance (CDVT);
   a maximum burst size (MBS);
   a sustained cell rate (SCR); or
   a packet discard (PD).

16. The apparatus in accordance with claim 1, wherein the new SVC connection leg is established with a new set of connection parameter values corresponding to the new connection service category.

17. The apparatus in accordance with claim 1, wherein the resources include at least one of:

interface resources;
   switch fabric resources; or
   firmware resources.

18. The apparatus in accordance with claim 1, wherein the control interface receives the command from a command line interface (CLI).

19. The apparatus in accordance with claim 1, wherein the control interface receives the command using a simple network management protocol (SNMP).

* * * * *